United States Patent [19]

Ryham

[11] Patent Number: 4,860,548
[45] Date of Patent: Aug. 29, 1989

[54] AIR CONDITIONING PROCESS AND APPARATUS THEREFOR

[75] Inventor: Rolf Ryham, Princeton, N.J.

[73] Assignee: Ahlströmföretagen Svenska AB, Norrköping, Sweden

[21] Appl. No.: 206,021

[22] Filed: Jun. 13, 1988

[51] Int. Cl.[4] .............................................. F25D 17/06
[52] U.S. Cl. .......................................... 62/94; 62/112; 62/271; 62/494
[58] Field of Search ................ 62/476, 494, 112, 271, 62/94

[56] References Cited

U.S. PATENT DOCUMENTS

| | | | |
|---|---|---|---|
| 3,417,574 | 12/1968 | Kelley | 62/271 X |
| 3,810,950 | 5/1974 | Woodle | 62/94 X |
| 4,164,125 | 8/1979 | Griffiths | 62/271 X |
| 4,171,620 | 10/1979 | Turner | 62/271 X |
| 4,197,713 | 4/1980 | Bulang | 62/94 |
| 4,197,714 | 4/1980 | Bradshaw | 62/271 X |
| 4,222,244 | 9/1980 | Meckler | 62/271 X |
| 4,259,849 | 4/1981 | Griffiths | 62/94 X |
| 4,313,312 | 2/1982 | Ito et al. | 62/94 X |
| 4,635,446 | 1/1987 | Meckler | 62/271 |
| 4,691,530 | 9/1987 | Meckler | 62/271 X |
| 4,748,830 | 6/1988 | Oouchi et al. | 62/494 X |

Primary Examiner—Lloyd L. King
Attorney, Agent, or Firm—Cohen, Pontani & Lieberman

[57] ABSTRACT

An air conditioning process and apparatus includes absorption of water vapor in a circulating absorption liquid composed of an aqueous salt solution. The absorption liquid is regenerated by evaporative concentration by indirect heat exchange with a heating fluid in an evaporator. The water vapor produced in the evaporator is condensed in a condenser by indirect heat exchange with a cooling liquid which is mainly composed of the absorption liquid to be concentrated or which has already been concentrated in the evaporator. The water vapor pressure over the cooling liquid in the condenser is lowered by causing gas to flow in contact with the cooling liquid.

9 Claims, 1 Drawing Sheet

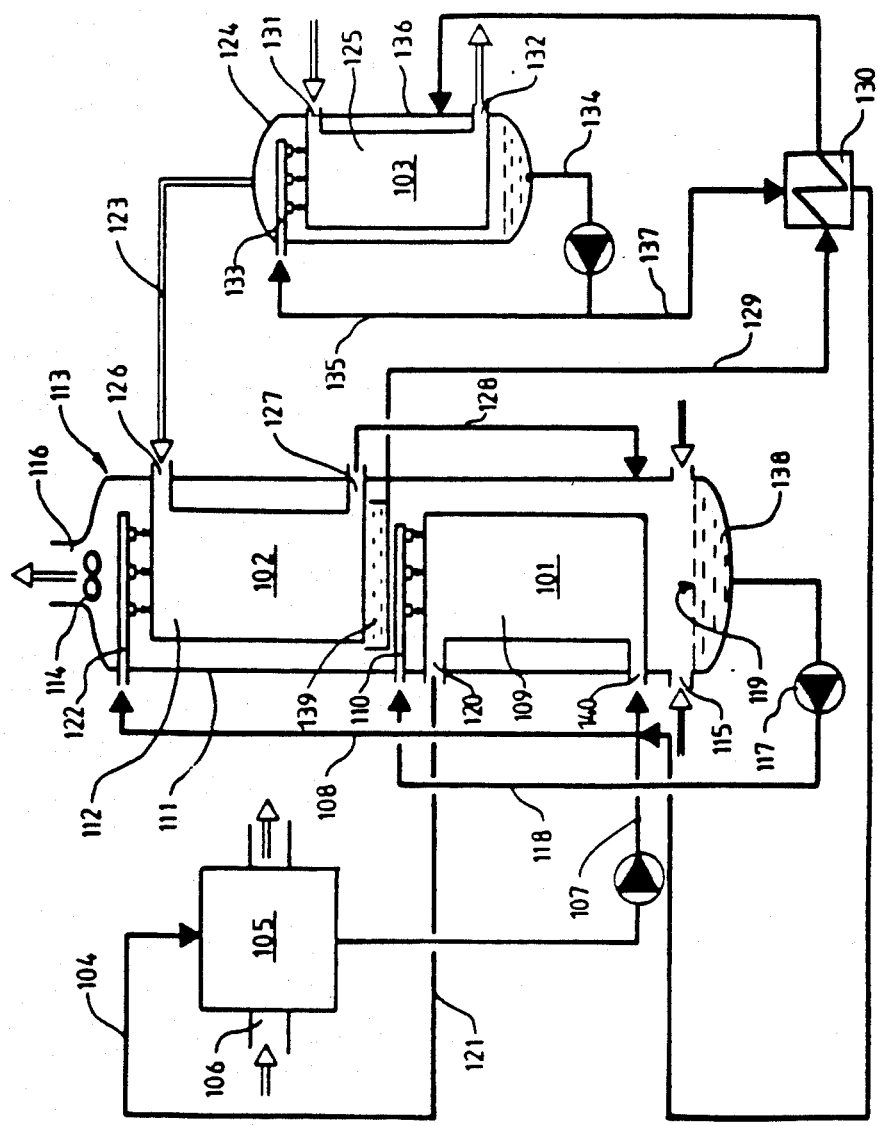

AIR CONDITIONING PROCESS AND APPARATUS THEREFOR

FIELD OF THE INVENTION

The present invention relates to a process and apparatus for the absorption of water vapor from a gas by a circulating absorption liquid and more particularly to air conditioning systems utilizing absorption technology.

BACKGROUND AND SUMMARY OF THE INVENTION

In conventional evaporating plants wherein a liquid is concentrated by evaporation in one or more stages or effects, the vapor from the last stage is usually condensed by indirect contact with cooling water in a condenser.

The present invention is directed to a method for concentrating a liquid by evaporation resulting in high thermal efficiency by utilizing the heat energy of the vapor leaving the evaporator instead of removing heat energy from the evaporating system to an external cooling water system.

It is accordingly an object of the present invention to improve the efficiency and to lower the energy consumption of air conditioning systems using absorption technology.

The present invention is particularly useful in the dehumidification of gas such as air by a water-absorbing salt solution which will be diluted by absorbing moisture from the gas. To enable the spent absorption liquid to be reused it is reconcentrated by evaporation.

According to one embodiment of the present invention, air is dehumidified by direct contact with a water-absorbing liquid. As the water absorbing liquid is used an aqueous solution of an easily soluble salt such as potassium acetate, sodium acetate, potassium carbonate, calcium chloride, lithium chloride or lithium bromide or the like or mixtures thereof. These concentrated salt solutions exhibit great affinity to water and consequently, exhibit low water vapor pressure above the solution.

If air is brought into contact with such a solution at a certain temperature and a certain relative humidity the solution will absorb water vapor from the air as long as its concentration results in a lower water vapor pressure than that present during the state of equilibrium.

When air is dehumidified by absorption of water vapor, the absorption liquid will become increasingly diluted by the absorbed water. As the only volatile component of the absorption liquid is water, the solution can be regenerated by evaporation. This is usually carried out by heating absorption liquid to a temperature at which the water vapor pressure thereof exceeds the atmospheric pressure thus causing the water to evaporate. The boiling point elevation of the concentrated saltwater solution suitable for absorption purposes is high. Generally, the dilution of the absorption liquid by absorption of water vapor is relatively small, and consequently evaporation in more than one stage or effect is usually not feasible so that the diluted absorption liquid is usually regenerated by evaporation in a single stage evaporator.

To regenerate the absorption liquid in an evaporator an amount of energy corresponding to the heat of vaporization is required. Additional energy is needed to heat up the liquid to the boiling temperature thereof and to compensate for heat losses and the like.

According to a preferred embodiment of the present invention, the heat energy of the vapor leaving the evaporator is used to evaporate water from the absorption liquid. This is accomplished by bringing the vapor into indirect contact with the absorption liquid before and/or after the absorption liquid is concentrated in the evaporator. The vapor exiting from the evaporator is brought into contact with the one surface of a heat exchange element while the absorption liquid is brought into contact with the other surface of the heat exchange element. The absorption liquid is caused to flow down preferably in form of a uniform thin film over the surface of the heat exchange element. In addition air is caused to flow in contact with the absorption liquid to lower the water vapor pressure above the absorption liquid thus enhancing the evaporation of water from the absorption liquid. The air will be saturated by water vapor and the vaporization heat is removed from the surface of the heat exchange element.

By condensing the vapor from the evaporator by means of the absorption liquid which thus will be concentrated before th evaporator and/or after the evaporator, a higher coefficient of performance as well as significant energy savings are obtained. An additional advantage of the invention is that the need for an external cooling water system is eliminated.

The present invention thus achieves with one evaporator an effect similar to evaporation in two stages at considerably lower specific energy consumption. Although only one evaporator is shown in the accompanying drawing, it will be understood that more than one evaporator can be used. If the number of evaporators used in the practice of this present invention equals n, the process of the invention effectively results in evaporation corresponding to n+1 stages or effects.

For a more complete understanding of the present invention and for further objects and advantages thereof, reference may now have to be taken to the following description in conjunction with the accompanying drawing.

BRIEF DESCRIPTION OF THE DRAWING

The appended Figure is a schematic flow diagram illustrating an air conditioning system in which a water-absorbing salt solution used for dehumidification of air is being concentrated by evaporation.

DESCRIPTION OF THE PRESENTLY PREFERRED EMBODIMENT

As shown in the drawing, the air condition system comprises a cooler 101, an evaporative condenser 102, an evaporator 103 and an absorber 105. The absorption liquid is fed through line or conduit 104 to absorb 105 and is brought into direct contact with air flowing through conduit 106 so as to remove moisture therefrom. Preferably, at least a portion of the absorption liquid laden with absorbed moisture from contacting the air is directed through conduit 107 to cooler 101 while another portion is directed through a branch conduit 108 to condenser 102. Condenser 102 preferably includes one or more vertically disposed spaced apart conventional heat exchange elements 112 which are preferably composed of pairs of substantially parallel plates which are connected at their edges to form a plurality of closed spaces within casing 111. Other configurations of heat exchangers such as a radial arrangement thereof or tube-type heat exchanges may also be utilized. Open channels are formed between the heat exchange elements 112. The interiors of the heat exchange elements are connected at their upper end to an inlet 126 for admitting water vapor and at their lower end to an outlet 127 for emitting condensate. A distributor 122 suitably provided with a plurality of openings or spray nozzles extends lengthwise across the casing above each heat exchange element so as to form means for distributing absorption liquid preferably substantially uniformly over the respective heat exchange elements. Casing 111 has an air outlet 116 located preferably in the upper end thereof and one or more air inlets 115 are provided preferably in the lower part of the casing. An impeller 114 is disposed preferably adjacent the outlet to bring about an upward flow of air through the casing.

The diluted absorption liquid to be concentrated by evaporation is fed to condenser 102 through branchline 108 and is introduced into distributor means 122 disposed above the heat exchange elements 112 of the condenser so as to cause the absorption liquid to flow down preferably in form of a uniform thin film over the outer surface of the heat exchange elements. Water vapor supplied through conduit 123 connected to the top of the casing 124 of evaporator 103 enclosing one or more heat exchange elements 125 is introduced through the inlet 126 into heat exchange elements 112. The absorption liquid flowing down along the outer surfaces of the heat exchange elements 112 will be heated by indirect contact with the hot water vapor exiting from evaporator 103. The air which is supplied through inlets 115 and which flows through the casing on the outside of the heat exchange elements will, by direct contact with the absorption liquid, lower the vapor pressure thereof and cause evaporation of water therefrom. The water vapor is removed together with the air flowing out from the condenser through the outlet 116. The scavenger air flowing through casing 111 through inlet 115 is preferably carefully balanced since the amount of scavenger air required for cooling the absorption liquid and flowing over heat exchange surfaces of cooler 101 without evaporative cooling is about ten times greater than with evaporative cooling as described above.

Thus, generally, 90% of the air introduced into inlet 115 can be withdrawn prior to the air coming into contact with condenser 102. The withdrawn air stream is not indicated in the drawing. Evaporation of water from the absorption liquid requires heat energy which is removed from the water vapor inside the heat exchange elements causing the vapor to condense. The condensate which will form within the heat exchange elements by indirect contact of the water vapor with the absorption liquid is removed from the heat exchangers through outlet 127 and passed to liquid pool 138 in the bottom of the casing through conduit 128.

Absorption liquid preconcentrated by evaporation of water therefrom is dropping down into container or vat 139 preferably disposed below the lower ends of the heat exchange elements 112. The preconcentrated absorption liquid is then fed to evaporator 103 through conduit 129 preferably via heat exchanger 130 to raise the temperature thereof prior to the entry into the evaporator by indirect contact with concentrated absorption liquid previously withdrawn from the evaporator through conduits 134 and 137, respectively.

The evaporator comprises preferably a plurality of heat exchange elements 125 which may be of similar construction as those of the condenser 102 having an inlet 131 and an outlet 132 for a heating fluid such as flue gas or steam. Distributor means 133 disposed above the upper ends of the heat exchange elements supplies absorption liquid preferably uniformly to the outside surface of the heat exchange elements. The absorption liquid will be heated to its boiling point whereupon water will evaporate from the absorption liquid which is flowing down over the surface of the heat exchange elements. The concentrated absorption liquid collected at the bottom of the casing 136 is withdrawn from the evaporator through discharge conduit 134. A portion of the concentrated absorption liquid may be recirculated to the distributor 133 through conduit 135. The remainder of the concentrated liquid is preferably passed through conduit 137 via heat exchanger 130 to cooler 101 throuqh inlet 140. Alternatively, and depending on the degree of required cooling of the moist air or gas flowing through conduit 106 all of the concentrated absorption liquid or a portion thereof may be directly fed from heat exchanger 103 to absorber 105 (not shown).

The water vapor generated in casing 136 of evaporator 103 by evaporation of the absorption liquid on the surface of the heat exchange elements 125 is withdrawn from the evaporator and passed through conduit 123 to condenser 102 to be condensed therein and to serve as a heating medium for preconcentrating the absorption liquid.

The absorption liquid fed to cooler 101 from the absorber 105 is introduced into inlet 140 of heat exchange elements 109 which may be of similar design as those of the condenser 102. The heat exchange elements of the cooler are preferably disposed below those of the condenser. The absorption liquid is brought into indirect contact with a cooling liquid supplied by distributor means 110 disposed above the heat exchange elements 109 and which is flowing down in form of a thin film preferably uniformly over the outer surfaces of the heat exchange elements. The cooling liquid may be any suitable liquid but preferably comprises mainly the condensate from the condenser 102 is collected at the bottom of casing 111 which encloses the heat exchange elements 109 of the cooler 101 and the heat exchange elements 112 of the condenser 102, which as mentioned above, are disposed preferably above elements 109.

It is an additional advantage of the present invention that the condensate 119 is used as the cooling liquid in the heat exchange elements of cooler 101 by withdrawing the condensate from liquid pool 138, preferably by pump 117 via conduit 118 and introducing the condensate into distributor means 110. The use of this condensate is advantageous because it comprises substantially distilled water thus avoiding encrusts and deposits on the heat exchange surfaces of heat exchange elements 109. Additional cooling water may, of course, be added, for example, to liquid pool 138. However, as pointed out, in contrast to known cooling devices using cooling water from outside sources, at least a significant part of the cooling water used the evaporative cooling at condenser 102 and cooler 101 originates from the moist air stream flowing through conduit 106.

The heat exchange elements 109, 112 and casing 111 form a cooling tower 113 through which air is drawn by mean of the impeller 114. As mentioned, cooling liquid/condensate 119 collected at the bottom of the casing is preferably circulated by a pump 117 through conduit 118 to the distributor 110. The level of the liquid 119 is preferably controlled and maintained substantially at a constant level.

The air flowing through casing or housing 111 over the outside of the heat exchange elements 109 of cooler 101 in direct contact with the outside surfaces wetted by the cooling liquid will cause evaporation of water from the cooling liquid. The evaporated water is removed by the air flow. Evaporation of water, in turn, causes removal of heat which is taken from the absorption liquid inside heat exchange elements 109. The cooled absorption liquid is withdrawn from heat exchange elements 109 through outlet 120 and returned to the absorber 104 through conduits 121 and 105.

EXAMPLE

Air is introduced into absorber 105 at a rate of 8,100 kg/h dry air and under the following conditions: t=30° C. dry bulb, 27° C. wet bulb; x=0.021 kg H2O/kg dry air.

After absorption, air is exiting from absorber 105 at a rate of 8,100 kg/h dry air under the following conditions: t=37° C. dry bulb, 20° C. wet bulb; x=0.0065 kg H2O/kg dry air. The amount of absorbed water is calculated as 8,100 (0.021-0.0065) =117 kg. The amount of heat transferred to cooler 101 is approximately 200,000 kJ/h in 38,000 kg/h absorption liquid.

During the absorption step the liquid stream in conduit 108 has taken up approximately 117 kg/h of water from the air. If the absorption liquid is evaporated in a single step evaporator after increasing the temperature of the absorption liquid to the temperature of the evaporator by heat exchange the energy consumption would be approximately 1 kg of steam per kg of evaporated water. Using the evaporative condenser in accordance with the present invention as pre- and/or post-evaporator for the absorption liquid reduces the amount of energy required for the evaporation by about 1.5–1.9 times as compared to the use of only the evaporator.

Instead of the described heat exchange elements other tube-type heat transfer elements may be used. Also, if the concentration of the diluted salt solution is low and the boiling point elevation thereof is therefor moderate thus enabling the evaporation in two or more conventional evaporation stages, the invention can be used to condense the water vapor from the second stage or any subsequent stage. The humidity and the temperature of the air stream can, of course, be controlled by spray water evaporating within the air stream.

Thus, it should be understood that the preferred embodiment and example described above are for illustrative purposes only and are not to be construed as limiting the scope of this invention which is properly delineated in the appended claims. While the invention has been herein shown and described as what is presently conceived to be the most practical and preferred embodiments thereof, it will be apparent to those of ordinary skill in the art that many modifications may be made thereof wherein the scope of the invention.

What is claimed:

1. A process for conditioning air comprising:
    contacting water containing air in an absorber with circulating absorption liquid comprising an aqueous salt solution to form diluted absorption liquid;
    heating at least a portion of said absorption liquid to its boiling point by indirect heat exchange with a heating fluid in an evaporator to form concentrated absorption liquid;
    condensing water vapor produced by heating said absorption liquid by indirect heat exchange in the evaporator with a cooling liquid in a condenser;
    utilizing as a cooling liquid in said condenser absorption liquid which is concentrated in said evaporator;
    causing air to flow through said condenser in contact with said absorption liquid to lower the water vapor pressure thereof; and
    recirculating said concentrated absorption liquid from said evaporator to said absorber.

2. The process in accordance with claim 1, further comprising:
    cooling at least a portion of said diluted absorption liquid from said absorber by bringing it into indirect heat exchanging contact with a cooling liquid on a cooling surface;
    evaporating water vapor from said cooling liquid; and
    recirculating said cooled absorption liquid to said absorber.

3. The process in accordance with claim 2, wherein said cooling liquid comprises condensate formed by condensating said water vapor from said evaporator.

4. The process in accordance with claim 1, wherein said absorption liquid is an aqueous solution comprising potassium acetate, sodium acetate, potassium carbonate, calcium chloride, lithium chloride, or lithium bromide or mixtures thereof.

5. The process in accordance with claim 1, wherein said absorption liquid is concentrated by evaporation after it has been utilized in said condenser.

6. The process in accordance with claim 1, wherein said absorption liquid is concentrated by evaporation prior to its utilization in said condenser.

7. An apparatus for conditioning air comprising:
    means for absorbing water from an air stream by contact with circulating absorption liquid;
    means for generating water vapor by vaporization of diluted absorption liquid comprising a first heat exchange element having a first and second heat exchange surface; said vaporization being conducted on said first surface of said first heat exchange element by addition of heat to said second surface of said first heat exchange element;
    means for generating a condensate by condensing water vapor comprising a second heat exchange element having a first and second heat exchange surface; said condensation taking place on said first surface of said second heat exchange element with transfer of heat to said absorption liquid on said second surface of said second heat exchange element;
    means in communication with said condenser means for introducing an air flow for causing vaporization of said absorption liquid by lowering the water vapor pressure thereof on said second surface of said second heat exchange element;
    first means for transferring absorption liquid from said condenser means to said evaporator means;
    second means for transferring water vapor from said evaporator means to said condenser means;
    third means for transferring absorption liquid from said evaporator means to said absorber means; and
    fourth means for transporting absorption liquid from said absorber means to said condenser means.

8. The apparatus in accordance with claim 7, further comprising means for cooling said absorption liquid comprising a third heat exchange element having a first and second heat exchange surface for cooling said absorption liquid on said first surface of said third heat exchange element with transfer of heat to said condensate from said condenser and for evaporating said condensate on said second surface of said third heat exchange element;

means in communication with said cooling means for introducing air for lowering the water vapor pressure of said condensate;

fifth means for transferring said condensate from said condenser means to said cooling means; and sixth means for transferring said cooled absorption liquid from said cooling means to said absorber means.

9. The apparatus in accordance with claim 8, wherein said second heat exchange element of said condenser means is disposed above said third heat exchange element of said cooling means; and both said second and said third heat exchange element being disposed in the same housing.

* * * * *